United States Patent
Ishii et al.

(10) Patent No.: US 9,523,828 B2
(45) Date of Patent: Dec. 20, 2016

(54) OPTICAL TRANSCEIVER HAVING BAIL WORKING INDEPENDENTLY OF LINEAR MOTION OF SLIDER

(71) Applicant: Sumitomo Electric Industries, Ltd., Osaka-shi (JP)

(72) Inventors: Kuniyuki Ishii, Yokohama (JP); Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/408,847

(22) PCT Filed: Jul. 25, 2014

(86) PCT No.: PCT/JP2014/070288
§ 371 (c)(1),
(2) Date: Dec. 17, 2014

(87) PCT Pub. No.: WO2015/016332
PCT Pub. Date: Feb. 5, 2015

(65) Prior Publication Data
US 2016/0131859 A1    May 12, 2016

(30) Foreign Application Priority Data

Aug. 1, 2013  (JP) .................................. 2013-160778

(51) Int. Cl.
*G02B 6/36*   (2006.01)
*G02B 6/42*   (2006.01)

(52) U.S. Cl.
CPC ........... *G02B 6/4261* (2013.01); *G02B 6/4246* (2013.01); *G02B 6/4278* (2013.01); *G02B 6/4292* (2013.01)

(58) Field of Classification Search
CPC ...... G02B 6/4261; G02B 6/3893; G02B 6/389
USPC ............................................... 385/53, 88–92
See application file for complete search history.

(56) References Cited

U.S. PATENT DOCUMENTS

| 6,851,867 | B2 | 2/2005 | Pang et al. |
| 6,872,010 | B1 | 3/2005 | Bianchini |
| 7,077,578 | B2* | 7/2006 | Lee .................. G06F 1/1632 385/88 |
| 8,226,305 | B2* | 7/2012 | Thirugnanam ...... G02B 6/4246 385/53 |

(Continued)

FOREIGN PATENT DOCUMENTS

| CN | 201886181 U | 6/2011 |
| EP | 1593993 A1 | 11/2005 |
| TW | M-311040 U | 5/2007 |

OTHER PUBLICATIONS

Notification of the First Office Action in Chinese Patent Application No. 201480001668.6, dated Sep. 9, 2015.

(Continued)

*Primary Examiner* — Ellen Kim
(74) *Attorney, Agent, or Firm* — Venable LLP; Michael A. Sartori; F. Brock Riggs

(57) ABSTRACT

A mechanism for an optical transceiver to latch with and release from a cage is disclosed. The mechanism includes a bail rotatable around an axis and a slider linearly movable between the latching position and the releasing position. The rotation of bail is independent of the liner motion of the slider.

11 Claims, 9 Drawing Sheets

(56) References Cited

U.S. PATENT DOCUMENTS

| | | | | |
|---|---|---|---|---|
| 8,465,215 B1* | 6/2013 | Huang | ................ | G02B 6/4261 |
| | | | | 385/56 |
| 8,794,848 B2* | 8/2014 | Sasaki | ................ | G02B 6/4246 |
| | | | | 385/53 |
| 9,028,155 B2* | 5/2015 | Wang | ................ | G02B 6/4261 |
| | | | | 385/92 |
| 9,146,366 B2* | 9/2015 | Koutrokois | .......... | G02B 6/4246 |
| 2005/0226587 A1 | 10/2005 | Minota et al. | | |
| 2008/0089649 A1 | 4/2008 | Wang | | |
| 2008/0187271 A1 | 8/2008 | Miyoshi et al. | | |

OTHER PUBLICATIONS

International Search Report and Written Opinion issued in International Application No. PCT/JP2014/070288 dated Nov. 11, 2014.

* cited by examiner

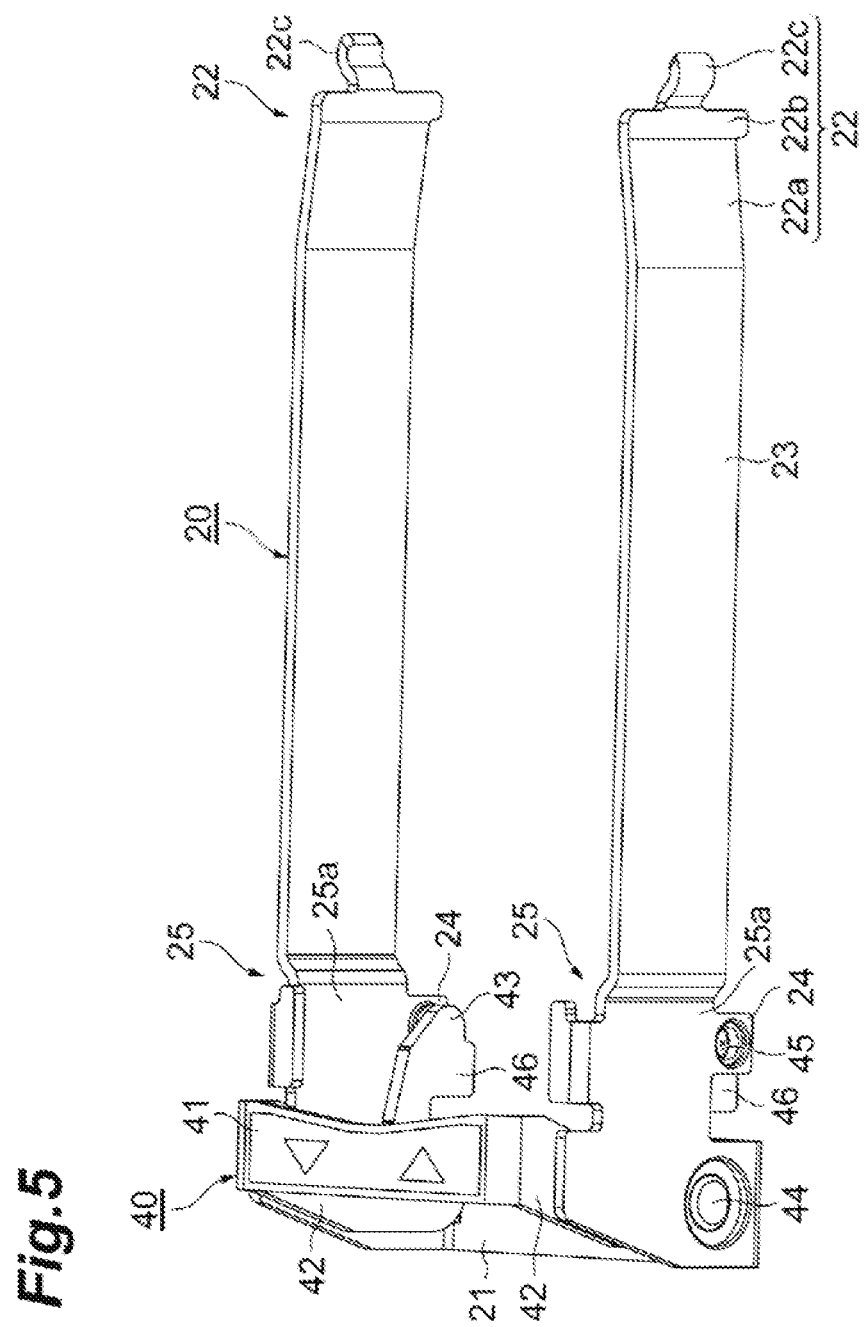

OPTICAL TRANSCEIVER HAVING BAIL WORKING INDEPENDENTLY OF LINEAR MOTION OF SLIDER

TECHNICAL FIELD

The present application relates to an optical transceiver, in particular, the application relates to a pluggable optical transceiver that implements a mechanism to be latched with and released from a cage provided in a host system.

BACKGROUND ART

One type of optical transceivers has a function to be latched with and released from a host system such as a router, a hub, and so on. Such an optical transceiver provides a housing, a slider, and a bail. The slider, which is assembled in both sides of the housing, slides along the longitudinal direction of the housing and the bail is assembled with the slider. A pivotal motion of the bail may cause the longitudinal slide of the slider, which may release the engagement between the housing with a cage.

A conventional mechanism of the bail and the slider thus described has a feature that the pivotal motion of the bail causes the linear motion of the slider. However, this mechanism has a disadvantage that, until the end of the pivotal motion of the bail, the optical transceiver is unable to be extracted from the cage of the host system. Thus, the conventional optical transceiver has a room to be improved in operability.

SUMMARY OF INVENTION

One aspect of the present application relates to a pluggable optical transceiver that is set within a cage provided in the host system. The optical transceiver includes at least a housing, a slider, and a bail. The slider is assembled with the housing and able to move linearly between a latching position and a releasing position. The optical transceiver is latched with the cage when the slider is set in the latching position, while, able to be released from the cage when the slider is in the releasing position. The bail is rotatable around an axis and assembled with the slider at the axis. A feature of the pluggable optical transceiver of the present application is that the rotation of the bail is independent of the linear motion of the slider. That is, even when the bail is rotated around the axis, the optical transceiver or the slider does not automatically release the optical transceiver from the housing. The rotation of the bail only sets the slider to be set in the releasing position; and, in order to release the optical transceiver from the cage, the slider is required to be linearly slid independent of the rotation of the bail.

BRIEF DESCRIPTION OF DRAWINGS

The foregoing and other purposes, aspects and advantages will be better understood from the following detailed description of a preferred embodiment of the invention with reference to the drawings, in which:

FIG. 5 is a perspective view of the bail assembled with the slider;

FIG. 7A illustrates a front portion of the optical transceiver when the bail is set in the first position where the optical transceiver is latched with the cage of the host system; while.

DESCRIPTION OF EMBODIMENTS

Next, details of embodiments of the present application will be described as referring to drawings. In the description of the drawings, numerals or symbols same with or similar to each other will refer to elements same with or similar to each other without duplicated explanations. However, it is apparent for ordinary artisans that embodiments of the invention should be considered in all respects as illustrative and not restrictive, the scope of the invention to be determined by the appended claims and their equivalents.

Figure 1:
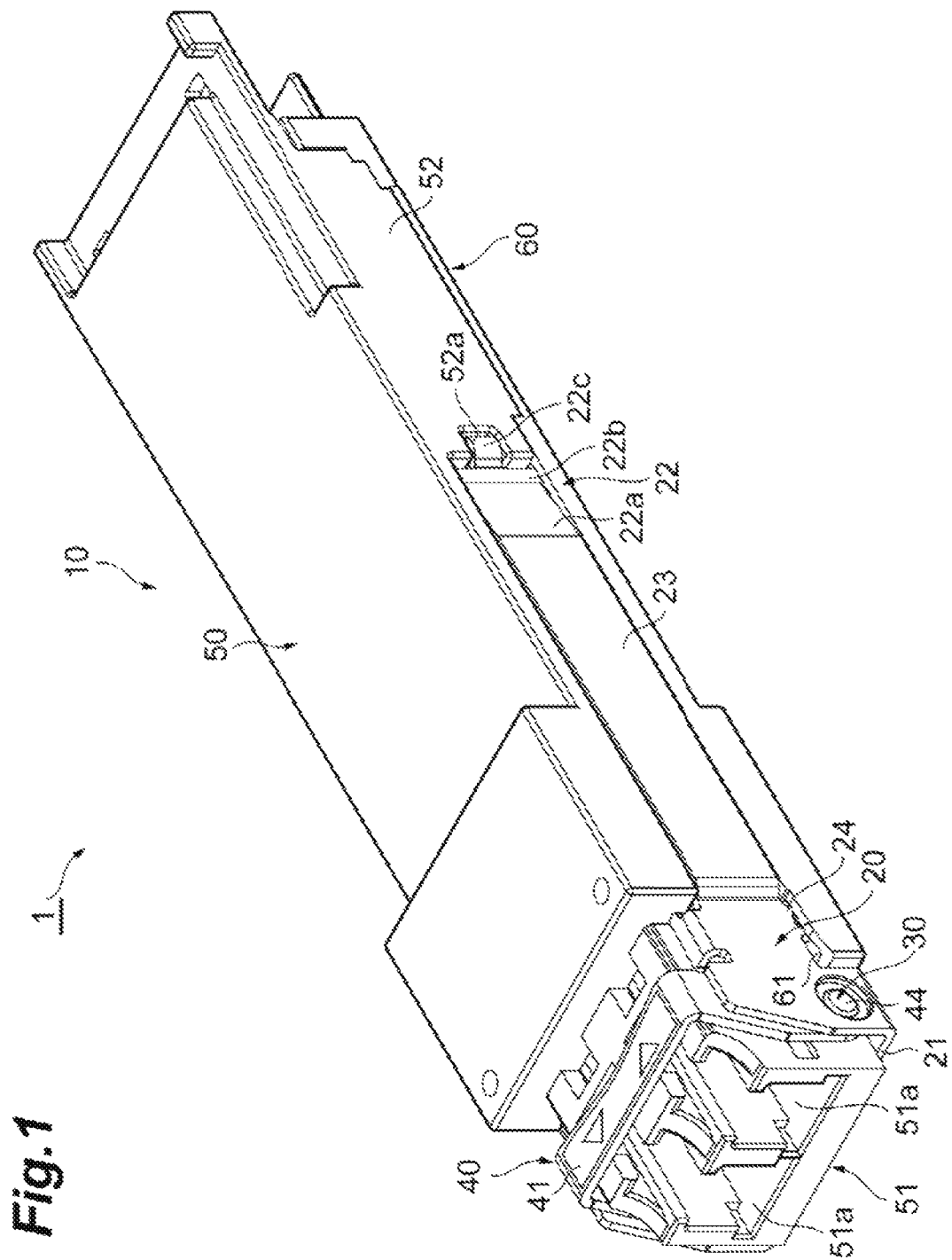
FIG. 1 is a perspective view showing an optical transceiver according to an embodiment of the present invention.
Figure 2:
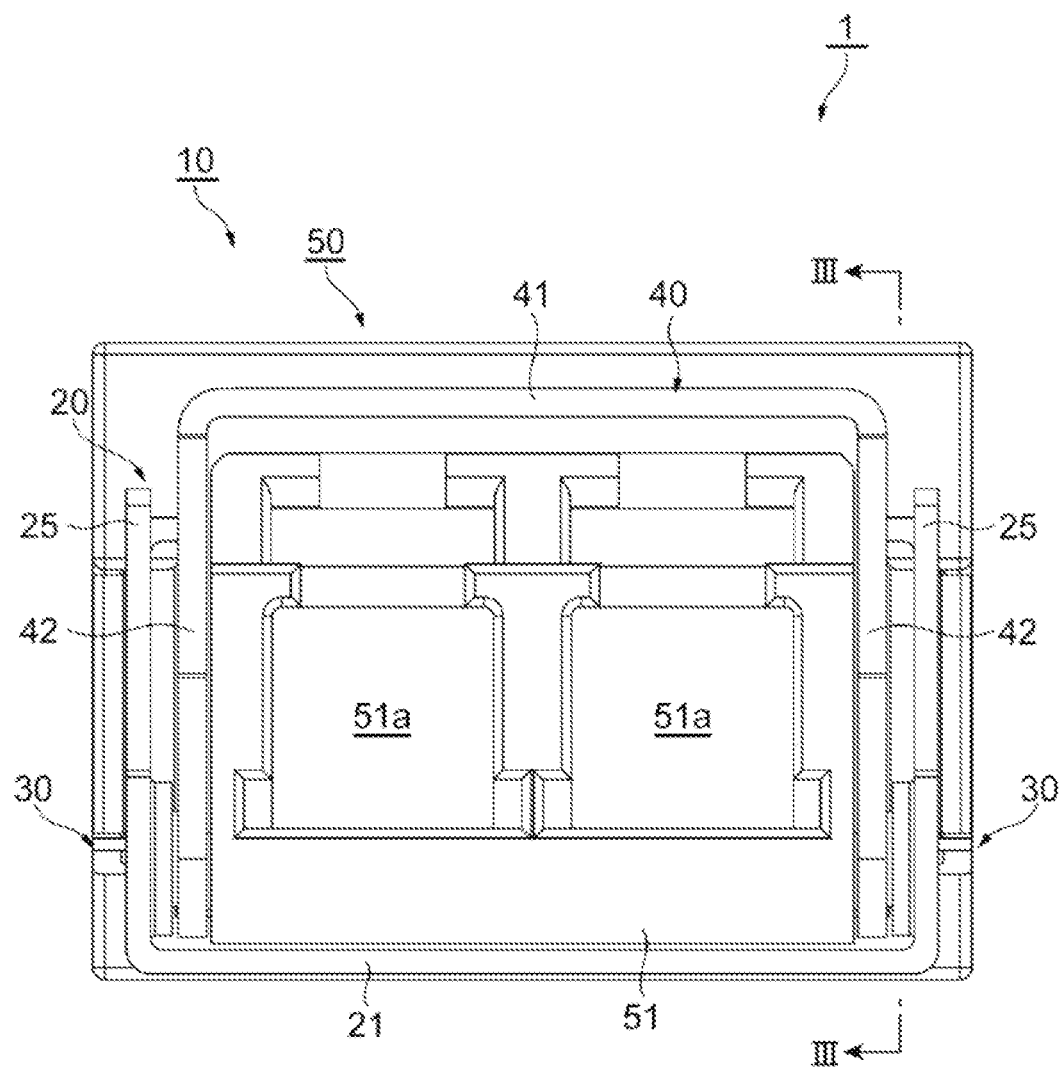
FIG. 2 is a front view of the optical transceiver shown in FIG. 1.
Figure 3:
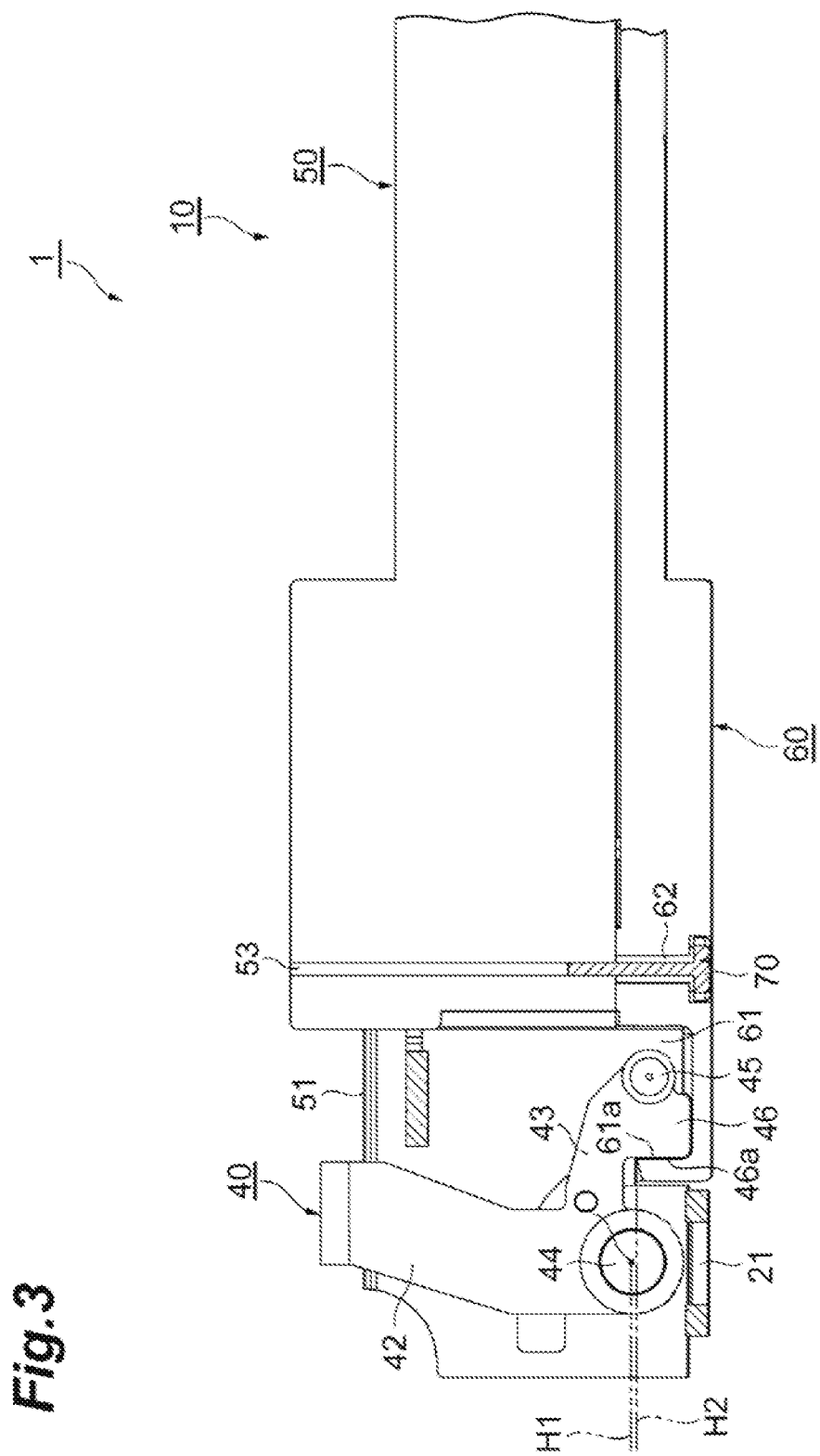
FIG. 3 is a cross section of the optical transceiver taken along the line III-III appearing in FIG. 2.

The optical transceiver 1 of the present embodiment is a type of, what is called, the pluggable optical transceiver plugged into a cage prepared in the host system. As illustrated in FIGS. 1 to 3, the optical transceiver 1 primarily includes a box-shaped housing 10, a slider 20, and a bail 40. The slider 20 is attached in respective sides of the housing 10 so as to freely move along the longitudinal axis of the housing 10. The bail 40 is assembled with the slider 20 such that the bail 40 freely rotates around an axis 30. The description below assumes that "front" is a side where the bail 40 is provided, while "rear" corresponds to the opposite.

The housing 10, which comprises a top housing 50 and a bottom housing 60, may be formed by die-casted aluminum, zinc, and so on; or by molded resin or plastic. The slider 20 is assembled with the bottom housing 60. The housing 10 encloses optical assemblies and electronic circuits in a cavity formed by the top and bottom housings, 50 and 60.

The top housing 50 provides in the front end thereof an optical receptacle 51 having two slots 51a each receiving optical connectors. One of slots 51a is for transmitting an optical signal to the optical connector, while, the other slot 51a is for receiving another optical signal from the optical connector. Mating a duplicated optical plug into the optical receptacle 51 and coupling two optical signals with optical devices installed within the housing 10, the optical transceiver 1 realizes the full-duplex optical communication.

The slider 20 includes a pair of arms 23 and a beam 21 connecting the arms 23. The beam 21, which is set under the optical receptacle 51, extends in parallel with the axis 30 of the bail 40. The beam 21 stabilizes the sliding motion of the slider 20 along the longitudinal direction. The arms 23 each provides a latch 22 in a rear end thereof to set the optical transceiver 1 in the cage. Specifically, the arm 23 provides, in the rear end thereof the first surface 22a bent inwardly, the second surface 22b extending from the first surface 22a but bent outwardly, and a hook 22c projecting outwardly in the tip end of the second surface 22b. The first and second surfaces, 22a and 22b, and the hook 22c constitute the latch 22. The hook 22c is set within a pocket 52a formed in the top housing 50 when the slider 20 is set in the deep end thereof. The slider 20 set in the deep end is called as the latching position, while, the position of the slider 20 at which the hook 22c pushes the tab of the cage outwardly is called as the releasing position.

Although not illustrated in figures, the cage, which has a box shape with a front opening through which the optical transceiver 1 is set therein, in the host system provides tabs in respective sides thereof. The tabs face the latches 22 and protrude inside of the cage so as to be set between the first and second surfaces, 22a and 22b, of the latch 22. Pulling the slider 20 frontward, the hook 22c pushes the latch in the cage outwardly to release the hooking between the tab and the latch 22; accordingly, the optical transceiver 1 is able to be pulled out from the cage.

Figure 4A:
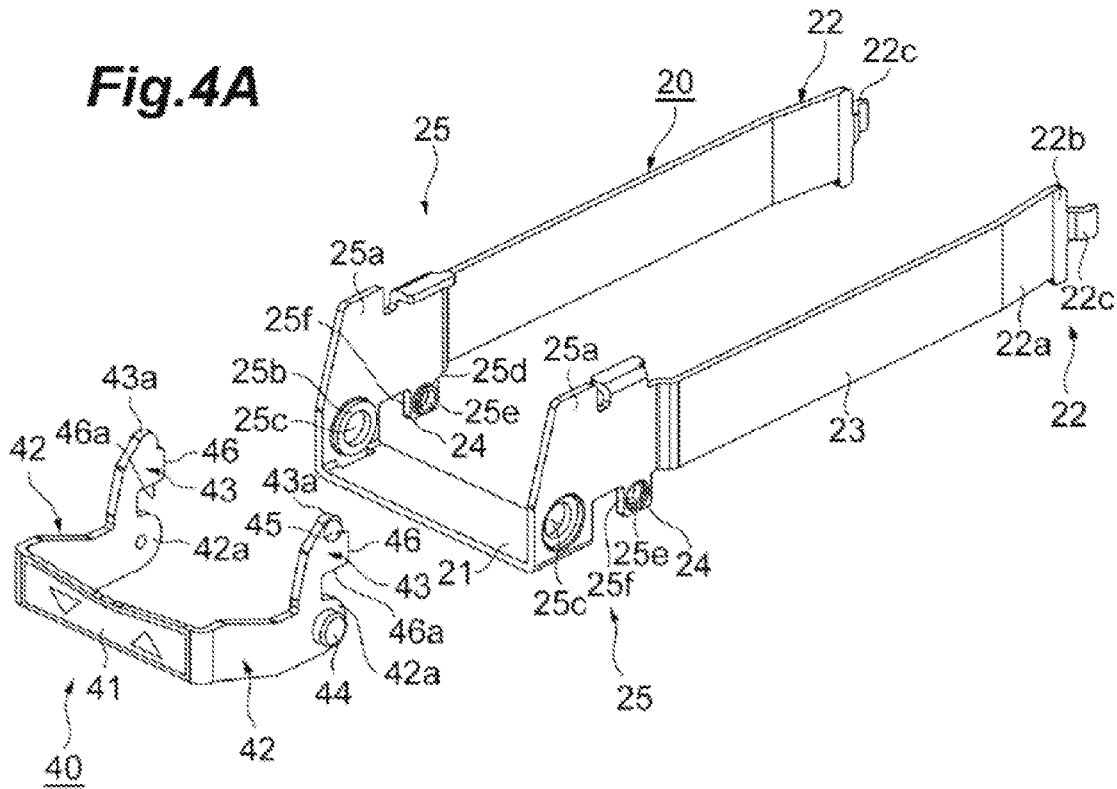
FIG. 4A is an exploded view of a bail and a slider.
Figure 4B:
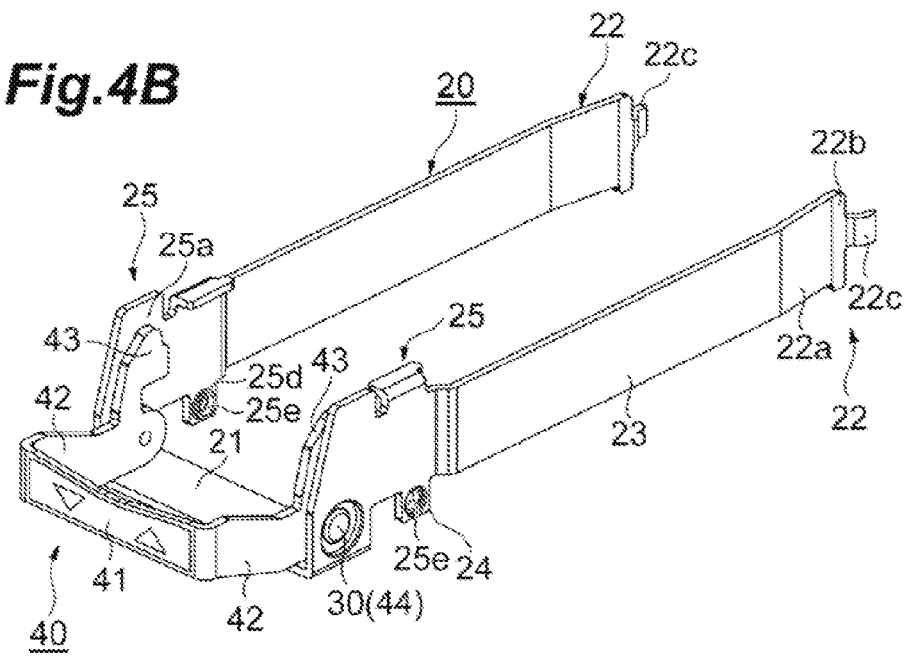
FIG. 4B shows the bail assembled with the slider.
Figure 6:
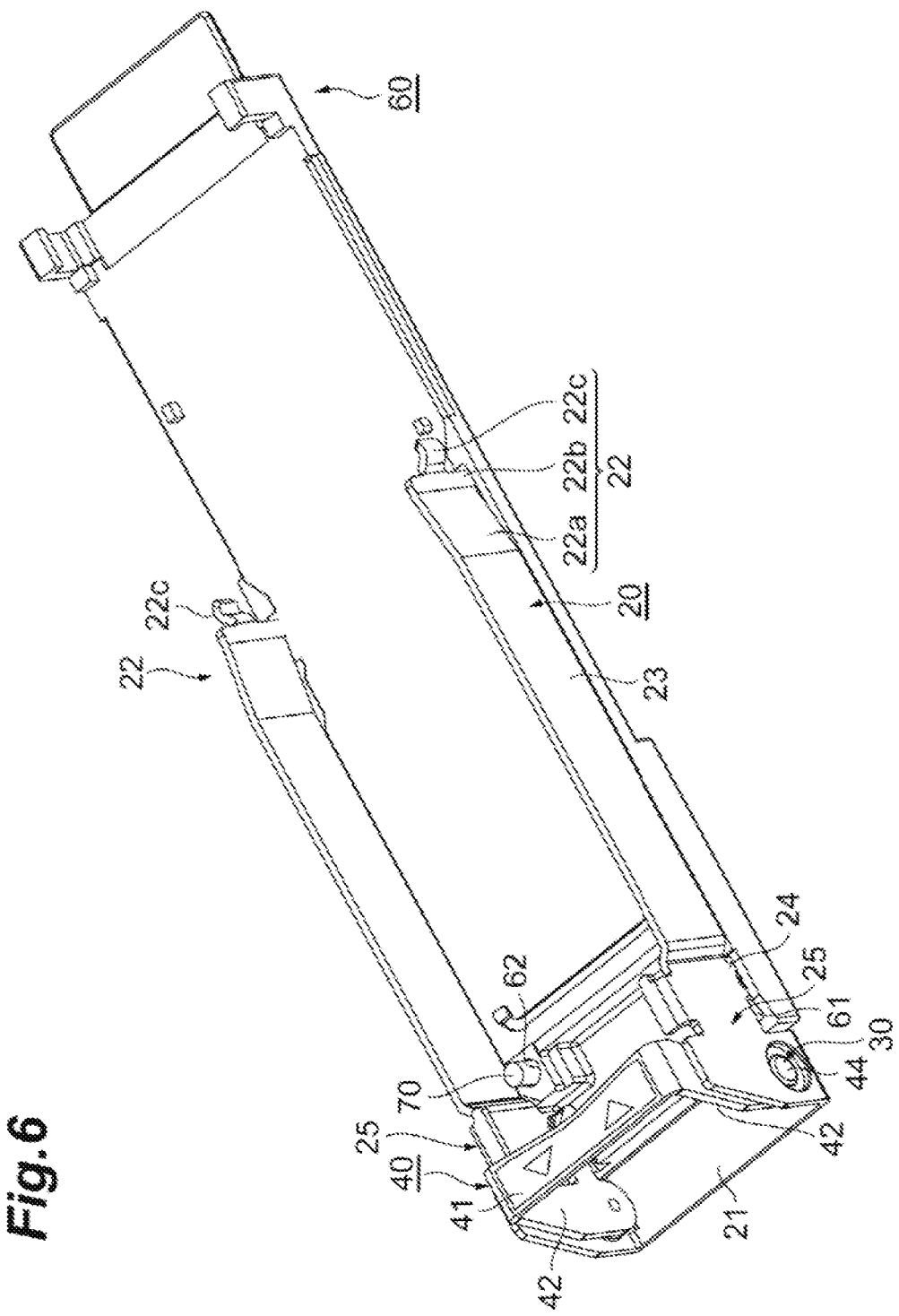
FIG. 6 is a perspective view of a latching/releasing mechanism including the bail and the slider assembled with the bottom housing.

Referring to FIGS. 4A and 4B, the arms 23 of the slider 20 provide, in a front end thereof, respective front portions 25 each including a slab 25a with a tab 24 and an axis hole 25c. The tab 24 extends downward from the rear bottom edge of the slab 25a; while, the axis hole 25c is formed in the front bottom side of the slab 25a. The axis hole 25c accompanies with a donut rib 25b protruding inwardly around the axis hole 25c. The tab 24 provides another hole 25e also accompanied with a donut rib 25d protruding inwardly around the other hole 25e. The beam 21 connects the bottom edge of the slab 25a with the bottom edge of the other slab 25a. Referring to FIG. 6, the tab 24 is set and movable within the front space 61 of the bottom housing 60.

The bail 40, as illustrated in FIGS. 2, 4A and 4B, provides a pair of legs 42 and a bridge 41 bridging the legs 42. The leg 42 is attached to the front portion 25 of the arm 23 such that, when the slider 20 is assembled with the housing 10, the bridge 41, the legs 42 and the beam 21 of the slider 20 surround the optical receptacle 51. The leg 42 provides, in an end thereof, a limb 43 extending from an end 42a thereof toward a direction perpendicular to the direction of the leg 42. The end 42a of the leg 42 further provides a projection 44 protruding outwardly; while, the limb 43 provides in an end 43a thereof another projection 45 also protruding outwardly. The former projection 44 has a pillared shape, while, the latter projection 45 has a rounded shape. Two projections, 44 and 45, may be formed by coining and/or burring in the press working of a metal plate. The limb 43 further provides a tab 46 extending in substantially parallel to the leg 42. The tab 46 is also set within the front space 61 in the bottom housing 60 similar to the tab 24 of the front portion 25 of the arm 23.

Assembling the bail 40 with the slider 20 as bending the legs 42 inwardly, two projections, 44 and 45, are set in respective holes, 25c and 25e. Because the projection 44 has the pillared shape and the axis hole 25c has a cylindrical inner surface, the projection 44 may smoothly rotate within the axis hole 25c. The projection 44 and the axis hole 25c becomes the axis of the rotation of the bail 40.

Pushing the bridge 41 rearward around the axis 30, the other projection 45 comes in contact with the donut rib 25d around the other hole 25e. Further rotating the bridge 41, the projection 45 is snapped within the other hole 25e. The rounded shape of the projection 45 facilitates the snapping motion of the projection 45.

The tab 24 of the front portion 25 of the arm 23 is, as already explained, movable in the front space 61 of the bottom housing 60. The front space 61 also provides screw holes 62 into which screws to assemble the bottom housing 60 with the top housing 50, as illustrated in FIGS. 3 and 6.

Assembling two housings, 50 and 60, the slider 20 assembled with the bail 40 is securely set between two housings, 50 and 60.

Next, the sliding mechanism of the slider 20 triggered by the rotation of the bail 40 will be explained.

When the optical transceiver 1 is tightly set within the cage, the slider 20 is deeply set within the housing 10 such that the hook 22c in the tip end of the latch 22 is set in the pocket 52a of the top housing 50, which the tab in the cage protrudes within the cage and is hooked with the latch 22. This position of the slider 20 is called as the latching position. In this case, the bridge 41 is set above the optical receptacle 51, and the legs 42 are vertically set between the front portion 25 of the arm 23 and the optical receptacle 51.

Figure 7A:
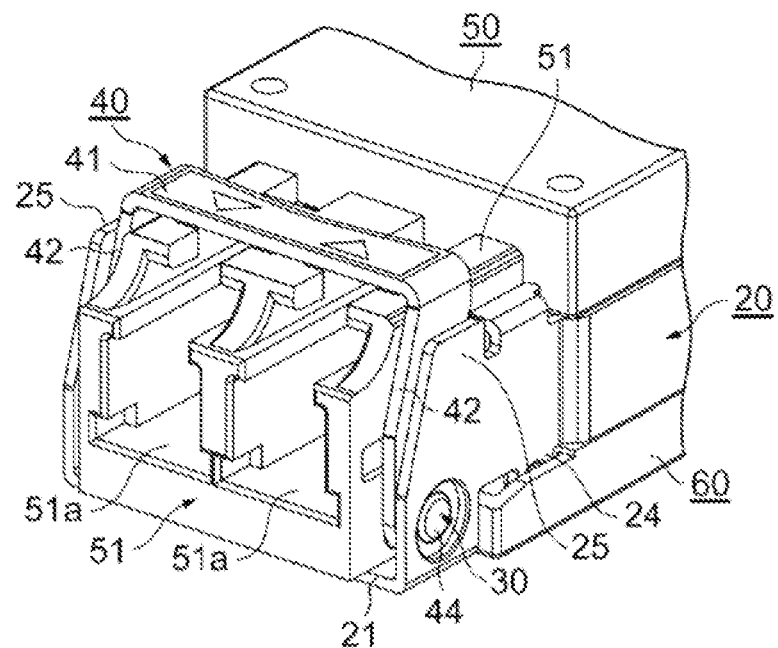
Figure 7B:
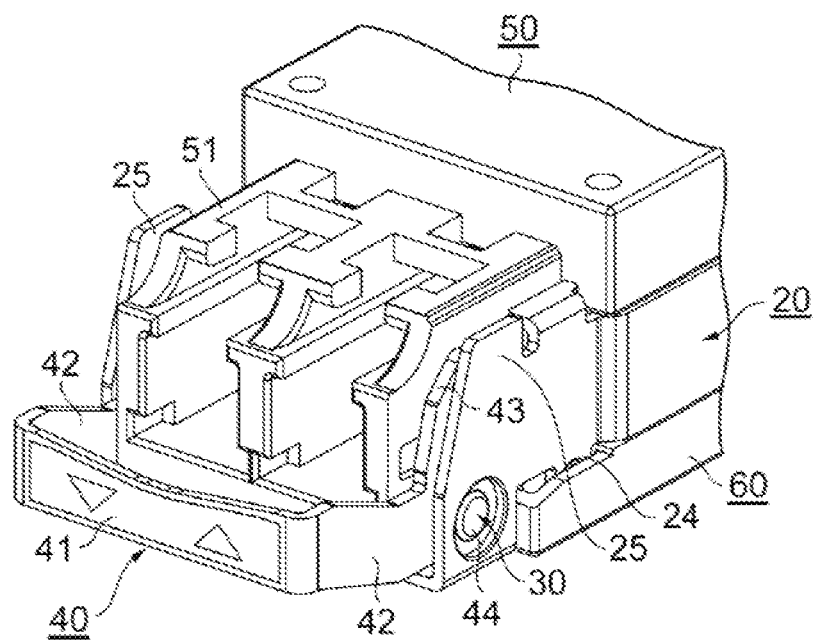
FIG. 7B shows the bail set in the second position where the optical transceiver is able to be released from the cage.

In addition, the rounded projection 45 of the limb 43 is snapped within the hole 25e and the tab 46 is set in the front space 61 of the bottom housing 60. Under such conditions of the tab 46, the motion of the slider 20 along the longitudinal direction may be effectively prevented because the front edge 46a of the tab 46 abuts against the front wall 61a of the space 61. Accordingly, the front wall 61a shows a function of a stopper for the longitudinal motion of the slider 20. Rotating the bail 40 around the pillared projection 44 as illustrated in FIGS. 7B and 8B, the snap-in between the rounded projection 45 and the hole 25e is released, and the tab 46 of the limb 43 is split out from the front space 61 of the bottom housing 60.

Figure 8A:
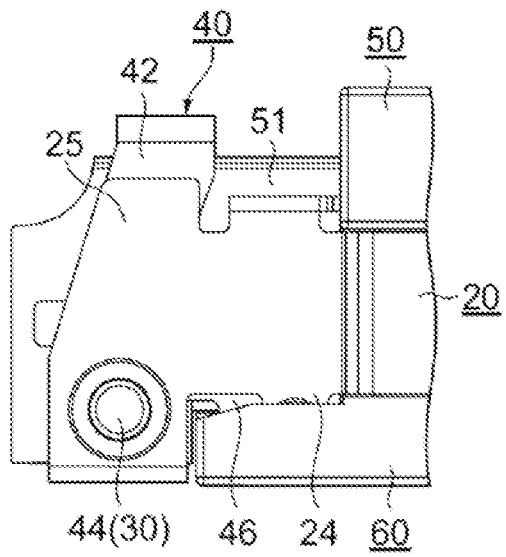
FIG. 8A shows the bail set in the first position.
Figure 8B:
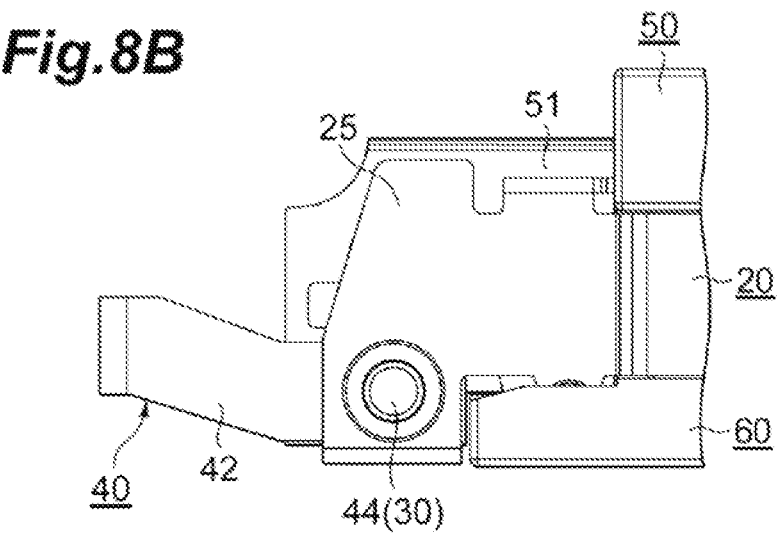
FIG. 8B shows the bail set in the second position but the slider is in a position not to release the engagement between the optical transceiver and the cage.
Figure 8C:
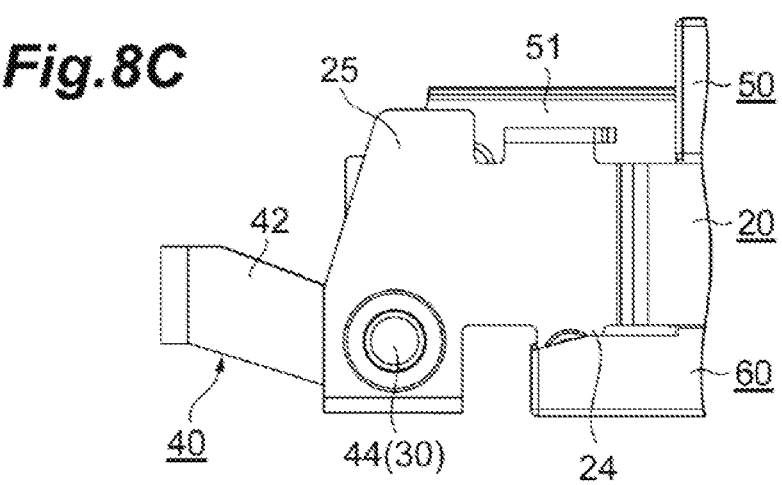
FIG. 8C shows the slider slid to another position to release the engagement.

Then, as illustrated in FIG. 8C, pulling the slider 20 frontward to release the engagement of the tab of the cage with the latch 22 of the slider 20, the optical transceiver 1 may be released from the cage. Further pulling the slider 20 frontward, the front surface 25f of the tab 24 abuts against the front wall 61a of the front space 60, which prevents the slider 20 from being slipped off from the housing 10. Moreover, the front surface 25f of the tab 24 presses the front wall 61a frontward, which facilitates the pull-out of the transceiver 1 from the cage.

Thus, in the optical transceiver 1 of the present embodiment, when the bail 40 is set in the first position shown in FIG. 8A, that is, the bridge 41 is set in the above of the optical receptacle 51, the tab 46 of the limb 43 in the front surface 46a thereof abuts against the front wall 61a of the bottom housing 60 to prevent the optical transceiver from being slipped off from the cage. When the bail 40 is in the second position shown in FIG. 8B, that is, the bail 40 is set in front of the optical receptacle 51, and the slider 20 is able to slide frontward. Thus, the sliding motion of the slider 20 is independent of the rotation of the bail 40. When the tab 46 is once slipped off from the front space 61 of the bottom housing 60 by the rotation of the bail 40 such that the contact against the front wall 61a is released, the slider 20 becomes movable even when the bail 40 is in a midway of the rotation. In such a status, the other tab 24 in the front portion of the arm 23 becomes a stopper to prevent the slider 20 from being slipped off from the housing 10 by making the front surface 25f of the tab 24 in contact with the front wall 61a of the bottom housing 60. When the optical transceiver 1 is extracted from the cage, the front surface 25f of the tab 24 abuts against the front wall 61 to facilitate the extraction.

A conventional pluggable transceiver, where the slider in the sliding motion thereof is tied with the rotation of the bail, that is, the rotation of the bail automatically induces the sliding motion of the slider, which causes an unintentional extraction of the optical transceiver from the cage. The present optical transceiver, in particular, the present mechanism of the bail and the slider makes the sliding motion of the slider independent of the rotation of the bail, which effectively prevents the optical transceiver from unintentional extraction from the cage. Moreover, even when the slider is pulled as the bail 40 is set in the first position of FIG. 8A, the tab 46 shows an effective function to prevent the slider 20 from sliding to the position shown in FIG. 8C.

Figure 9A:
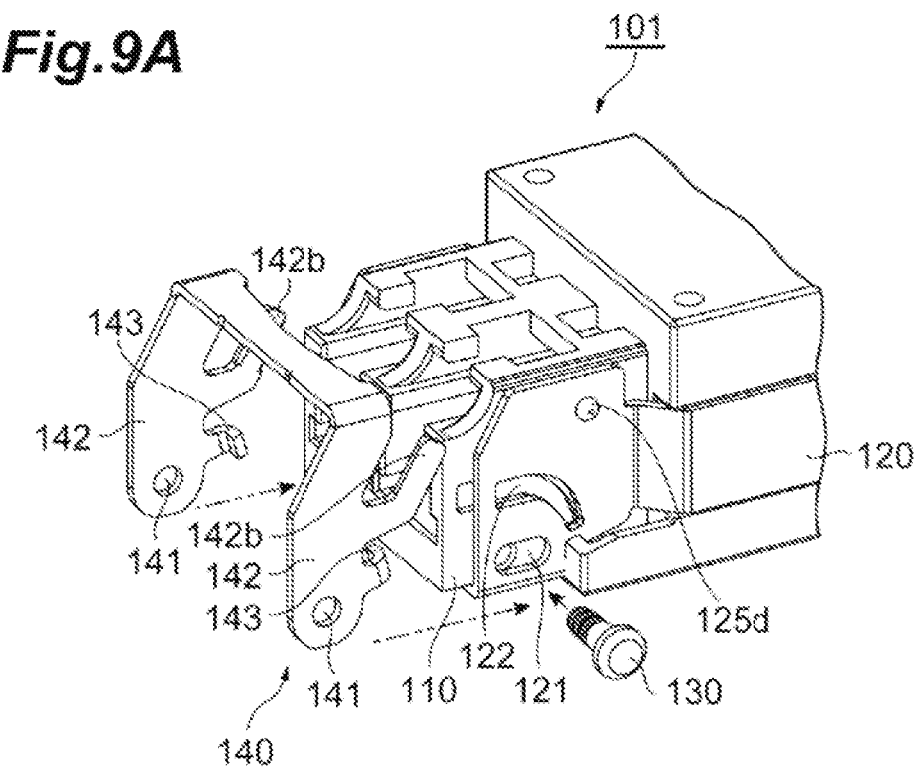
FIGS. 9A and 9B illustrate a mechanism of the bail and the slider where the slider is able to work with the pivotal motion of the bail.
Figure 9B:
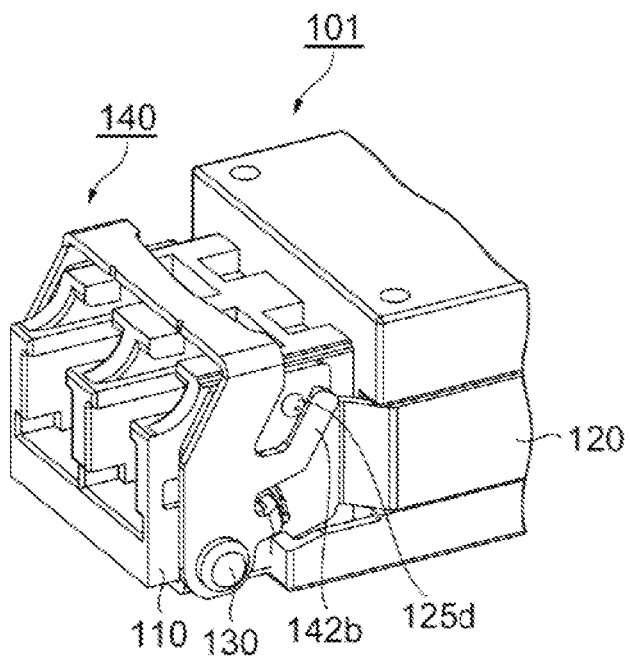

FIGS. 9A and 9B show mechanism of the bail and the latch of a conventional pluggable transceiver 101 that provides a slider 120 and a bail 140 rotatable by a pin 130 as a center of the rotation. The pin 130 is press-fit into the housing 110 as piercing a hole 141 of the legs 142 and another hole 121 of the slider 120. The press-fitting of the pin 130 is, in addition to a fact that it requires a specific tool and an apparatus, irrevocable process. Once the pin 130 is press-fit into the housing 110, the housing is unable to be recycled even when components except for the housing become apparent to have failures. Thus, the conventional mechanism of the bail 140 and the slider 120 causes lesser production cost.

The bail 40 and slider 20 of the present embodiment omits the press-fit pin 130 because, as shown in FIGS. 4A and 4B, the pillared projection 44 set in the axis hole 25c becomes the center of the rotation of the bail 40. The conventional bail 140 shown in FIGS. 9A and 9B is necessary to provide a hook 143 and a tab 142b. The hook 143, guided within an arched groove 122, causes the sliding motion of the slider 120 as the bail 140 rotates around the axis of the pin 130. The hook 142b induces the snap action by getting over the rounded projection 125d. Thus, the conventional bail 140 requires a complicated structure.

Referring to FIG. 2, the bail 40 of the present embodiment, at least a portion thereof, is set between the optical receptacle 51 and the slider 20, which prevents the bail 40 from being slipped out from the optical transceiver 1. In addition, when the bail 40 is fully pivoted in the last position shown in FIG. 8C, the rounded projection 45 is set in the hole 25e running over the donut rib 25d around the hole 25e, which effectively sets the bail 40 within the hole 25e and prevents the bail 40 from backward rotation.

Moreover, referring to FIG. 3, the optical transceiver 1 of the embodiment has a height H1 of the center O of the pillared projection 44 measured from the bottom of the housing 10 substantially equal to the height H2 of the front wall 61a of the front space 61 of the bottom housing 60. That is, the level of the center of the pillared projection 44 is substantially equal to the top level of the front wall 61a. This arrangement makes the height of the tab 46, or the length of the front surface 46a of the tab 46, in minimum to show the function of the reliable stopper for the illegal motion of the slider 20.

In addition, the rounded projection 45, or the limb 43 is always hidden by the front portion 25a of the arm 23 independent of the status of the bail 20. Referring to FIGS. 9A and 9B, the conventional mechanism to show the snap action of the bail 140 exposes the tab 142b which possibly causes an illegal action of the bail 140 when the bail 140 is manually manipulated.

While, particular embodiments of the present invention have been described herein for purposes of illustration, many modifications and changes will become apparent to those skilled in the art. For instance, the optical transceiver 1 thus described provides a pair of the sliders 20 and the bridge 21 bridging the sliders 20. However, the bridge 21 is omissible. The slider 20 provides two holes, 25c and 25e, in the front portion 25a thereof; but, these holes, 25c and 25e, are replaceable to concaves or dimples to receive the pillared projection 44 and the rounded projection 45, respectively.

The slider 20 of the embodiment provides the arms 23, the latches 22, and the front portions 25a; but, the detail shape of the slider 20 is optional.

The embodiment above described provides the pillared projection in the bail and the hole 25c in the slider 20 to form the center axis 30 of the rotational motion of the bail 20. However, the relation of the projection and the hole may be reversible. That is, the bail may provide a hole, while, the slider may provide the projection. Further, the bail 40 provides the rounded projection 45, while, the slider 20 provides the hole 24e receiving the rounded projection 45. However, this relation of a projection and a hole may be reversible. The bail 40 may provide a hole or a dimple, while, the slider 20 may provide a projection set within the hole or the dimple to show the snap action.

Finally, the embodiment thus described provides the top housing 50 and the bottom housing 60 assembled with the top housing 50 to constitute the housing 10. However, the optical transceiver 1 is unnecessary to divide the housing 10 into two parts. The housing 10 having a shape able to be inserted into the cage is the only the necessity condition for the pluggable optical transceiver.

Accordingly, the appended claims are intended to encompass all such modifications and changes as fall within the true spirit and scope of this invention.

The invention claimed is:

1. A pluggable optical transceiver set within a cage provided in a host system, comprising:
    a housing including an optical receptacle and a stopper, the optical receptacle receiving an external optical connector;
    a slider set in the housing, the slider being linearly movable between a latching position and a releasing position, the optical transceiver being latched with the cage when the slider is in the latching position and released from the cage when the slider is in the releasing position; and
    a bail that is capable of rotating between a first position and a second position around an axis and assembled with the slider at the axis,
    wherein, when the bail is at the first position, the optical receptacle is capable of receiving the external optical connector and the slider is prohibited from moving between the latching position and the releasing position by abutting a tab provided in the bail against the stopper of the housing,
    wherein, when the bail is at the second position, the slider is capable of moving linearly between the latching position and the releasing position, and
    wherein the rotation of the bail is independent of the linear motion of the slider.

2. The pluggable optical transceiver of claim 1,
    wherein the slider has another tab abutting against the stopper of the housing when the bail is in the second position, the another tab preventing the slider from being disassembled with the housing.

3. The pluggable optical transceiver of claim 1,
    wherein the bail has a pair of legs and a bridge that connects the legs, and the slider has a pair of arms and a beam that connects the arms, and
    when the bail is set at the first position, the bridge, the legs, and the beam surround the optical receptacle.

4. The pluggable optical transceiver of claim 3,
    when the bail is set at the second position, the bridge is set in front of the optical receptacle and prevents the optical receptacle from receiving the external optical connector.

5. The pluggable optical transceiver of claim 3,
wherein the legs provide a pillared projection in an end portion thereof opposite to a portion connected to the bridge, the pillared projected being inserted in an axis hole provided in the slider, the pillared projection and the axis hole forming the axis around which the bail rotates.

6. The pluggable optical transceiver of claim 5,
wherein the legs of the bail each provides a limb extending from the end portion thereof toward a direction intersecting a direction along which the legs extend, the limb providing a rounded projection in an end portion thereof, and
wherein the arms of the slider each provides an opening that receives the rounded projection, and
wherein the bail is set in the first position as a snap action of the rounded projection of the leg into the opening of the arm.

7. The pluggable optical transceiver of claim 6,
wherein the opening of the slider provides a donut rib therearound.

8. The pluggable optical transceiver of claim 6,
wherein the limb provides a tab including a front edge that abuts against the stopper of the housing when the bail is set at the first position.

9. The pluggable optical transceiver of claim 6,
wherein the slider provides a tab including a front edge that abuts against the stopper of the housing when the bail is set at the second position.

10. The pluggable optical transceiver of claim 9,
wherein the limb provides a tab including a front edge that abuts against the stopper of the housing when the bail is set at the first position, and
wherein the front edge of the limb is in front of the front edge of the slider when the bail is set at the first position.

11. The pluggable optical transceiver of claim 6,
wherein the legs each provides a limb extending from the end portion thereof toward a direction intersecting a direction along which the leg extends, the limb providing a rounded projection in an end portion thereof, and
wherein the arms of the slider each provides a depression that receives the rounded projection of the leg by the snap action of the rounded projection of the limb into the depression.

\* \* \* \* \*